US006934135B1

(12) United States Patent
Ryan

(10) Patent No.: US 6,934,135 B1
(45) Date of Patent: Aug. 23, 2005

(54) DISK DRIVE MONITORING A SUPPLY CURRENT TO PROTECT MOTOR DRIVER CIRCUITS

(75) Inventor: Robert P. Ryan, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 351 days.

(21) Appl. No.: 10/377,219

(22) Filed: Feb. 28, 2003

(51) Int. Cl.$^7$ .............................................. H02H 5/04
(52) U.S. Cl. ....................................................... 361/23
(58) Field of Search ........................................... 361/23

(56) References Cited

U.S. PATENT DOCUMENTS

| | | | |
|---|---|---|---|
| 5,442,272 A | | 8/1995 | Schwartz |
| 5,592,353 A | * | 1/1997 | Shinohara et al. ............ 361/63 |
| 5,666,463 A | | 9/1997 | Schwartz et al. |
| 5,774,315 A | | 6/1998 | Mussenden |
| 5,898,283 A | | 4/1999 | Bennett |
| 5,930,096 A | | 7/1999 | Kim |
| 6,013,990 A | | 1/2000 | Lee |
| 6,462,496 B1 | * | 10/2002 | Hassan et al. ............... 318/560 |
| 6,549,359 B1 | * | 4/2003 | Bennett et al. ............... 360/69 |
| 6,549,361 B1 | * | 4/2003 | Bennett et al. ............... 360/75 |
| 6,574,062 B1 | * | 6/2003 | Bennett et al. ............... 360/69 |
| 6,577,465 B1 | * | 6/2003 | Bennett et al. ............... 360/69 |
| 6,617,817 B2 | * | 9/2003 | Hill ............................ 318/560 |
| 6,859,340 B2 | * | 2/2005 | Brittner et al. ............... 360/75 |
| 6,876,508 B1 | * | 4/2005 | Patton et al. ............. 360/73.03 |

OTHER PUBLICATIONS

U.S. Appl. No. 10/210,399, filed Jul. 31, 2002 entitled "Decreasing Spin Up Time in a Disk Drive by Adjusting a Duty Cycle of a Spindle Motor PWM Signal to Maintain Constant Average Input Current".

* cited by examiner

Primary Examiner—Stephen W. Jackson
Assistant Examiner—James Demakis
(74) Attorney, Agent, or Firm—Milad G. Shara, Esq.; Howard H. Sheerin, Esq.

(57) ABSTRACT

A disk drive is disclosed comprising a spindle motor for rotating a disk and a voice coil motor (VCM) for actuating a head over the disk. The spindle motor comprises a plurality of windings, and the VCM comprises a voice coil. If the current flowing from a supply voltage exceeds a threshold, the windings are disconnected from the supply voltage, the voice coil is disconnected from the supply voltage, and the first and second ends of the voice coil are connected to ground.

12 Claims, 6 Drawing Sheets

DISK DRIVE MONITORING A SUPPLY CURRENT TO PROTECT MOTOR DRIVER CIRCUITS

BACKGROUND OF THE INVENTION

1. Field of the Invention

The present invention relates to disk drives for computer systems. More particularly, the present invention relates to a disk drive monitoring a supply current to protect motor driver circuits.

2. Description of the Prior Art

FIG. 1 shows a prior art disk drive comprising a disk 2 rotated about a center axis by a spindle motor 4. The spindle motor 4 comprises a number of windings (e.g., φA, φB, φC) configured to form a multi-phase motor. Each winding (φA, φB, φC) has a first end connected to a center tap and a second end connected to a respective pair of switches (6A, 6B, 6C). Switching logic 8 generates a control signal 10 for controlling the switches (6A, 6B, 6C) to selectively connect the second end of the windings to a supply voltage 12 or to ground according to a commutation sequence. A current flowing from the supply voltage 12 through the windings to ground generates a torque which causes the spindle motor 4 to rotate. A signal generator 14 generates a modulated periodic signal 16 (e.g., a pulse width modulated (PWM) signal) which controls the switches (6A, 6B, 6C) to control the amount of current flowing through the windings (the amount of torque) and thereby the speed of the spindle motor 4. The modulated periodic signal 16 may control either the top or bottom switch in each pair of switches (6A, 6B, 6C).

The prior art disk drive of FIG. 1 further comprises a voice coil motor (VCM) 18 for rotating an actuator arm 20 about a pivot in order to actuate a head 22 radially over the surface of the disk 2. A VCM driver circuit 24 comprising an H-bridge driver drives current from the supply voltage 12 through a voice coil of the VCM 18 to ground. The current following through the voice coil to ground generates a torque which rotates the actuator arm 20 about the pivot, wherein the direction of rotation is determined by the direction of current flowing through the voice coil. The H-bridge driver in the VCM driver circuit 24 is typically operated in a linear or PWM mode.

Excessive current due, for example, to a motor winding shorting to a ground source can damage the motor driver circuits. A short may be caused by a lead in the printed circuit board assembly (PCBA) contacting the case of the disk drive or bracket assembly of the host computer. The motor winding may also short to the magnets within the motor. In the prior art disk drive of FIG. 1, each pair of switches (6A, 6B, 6C) comprises a high-side current sensor (26A, 26B, 26C) for sensing the magnitude of the current ($I_A$, $I_B$, $I_C$) flowing through the respective switches and a low-side current sensor (27A, 27B, 27C) used for current regulation in a servo loop. A current limit circuit 28 deactivates the modulated periodic signal 16 through AND gate 30 if the magnitude of the current sense signals ($I_A$, $I_B$, $I_C$) exceeds a threshold, thereby preventing excessive current from damaging the switches (6A, 6B, 6C). Although this technique helps protect the driver circuits of the spindle motor 4, the driver circuits of the VCM 18 remain susceptible to damage from excessive current. This technique also increases the cost and complexity of the disk drive since it requires a separate current sensor for each pair of switches (6A, 6B, 6C) of the spindle motor 4. Current sensors could also be employed to protect the driver circuits for the VCM 18 (similar to the current sensors (26A, 26B, 26C) that protect the driver circuits for the spindle motor 4); however, this solution would also increase the cost and complexity of the disk drive.

There is, therefore, a need for a disk drive with improved current limit protection of motor driver circuits.

SUMMARY OF THE INVENTION

The present invention may be regarded as a disk drive comprising a disk, a head, a voice coil motor (VCM) for actuating the head over the disk, the VCM comprising a voice coil having a first end and a second end. The disk drive further comprises an interface for receiving a supply voltage from a host computer. A VCM driver connects the voice coil to the supply voltage in order to actuate the head over the disk. A spindle motor rotates the disk, the spindle motor comprising a plurality of windings, wherein each winding comprises a first end and a second end. A spindle driver selectively connects the windings to the supply voltage according to a commutation sequence in order to rotate the spindle motor. A first current sensor generates a current sense signal representing a current flowing from the supply voltage, and a current limit circuit compares the current sense signal to a first threshold. If the current sense signal exceeds the first threshold, the windings are disconnected from the supply voltage, the voice coil is disconnected from the supply voltage, and the first and second ends of the voice coil are connected to ground.

In one embodiment, the windings remain disconnected from the supply voltage and the first and second ends of the voice coil remain connected to ground while the current sense signal exceeds a second threshold lower than the first threshold. In an alternative embodiment, the windings remain disconnected from the supply voltage and the first and second ends of the voice coil remain connected to ground for a predetermined interval after the current sense signal exceeds the first threshold.

In another embodiment, the spindle driver comprises a plurality of switches for selectively connecting the windings to the supply voltage and to ground, and switching logic for controlling the switches according to the commutation sequence in order to rotate the spindle motor. The current limit circuit disconnects the windings from the supply voltage and disconnects the windings from ground if the current sense signal exceeds the first threshold. In an alternative embodiment, the current limit circuit disconnects the windings from the supply voltage and connects the windings to ground if the current sense signal exceeds the first threshold.

In yet another embodiment, the spindle driver comprises a signal generator for generating a pulse width modulated (PWM) signal. The PWM signal for controlling the switches to control the amount of current flowing through the windings from the supply voltage. The current limit circuit deactivates the PWM signal to disconnect the windings from the supply voltage if the current sense signal exceeds the first threshold.

The present invention may also be regarded as a method of operating a disk drive. The disk drive comprising a disk, a head, a voice coil motor (VCM) for actuating the head over the disk, the VCM comprising a voice coil having a first end and a second end. The disk drive further comprises an interface for receiving a supply voltage from a host computer, and a spindle motor for rotating the disk, the spindle motor comprising a plurality of windings, wherein each winding comprises a first end and a second end. The voice coil is connected to the supply voltage to actuate the head over the disk. The windings are selectively connected to the supply voltage according to a commutation sequence in order to rotate the spindle motor. A current sense signal is generated representing a current flowing from the supply voltage. The current sense signal is compared to a threshold, and if the current sense signal exceeds the threshold, the windings are disconnected from the supply voltage, the voice coil is disconnected from the supply voltage, and the first and second ends of the voice coil are connected to ground.

DESCRIPTION OF THE PREFERRED EMBODIMENTS

Figure 1:
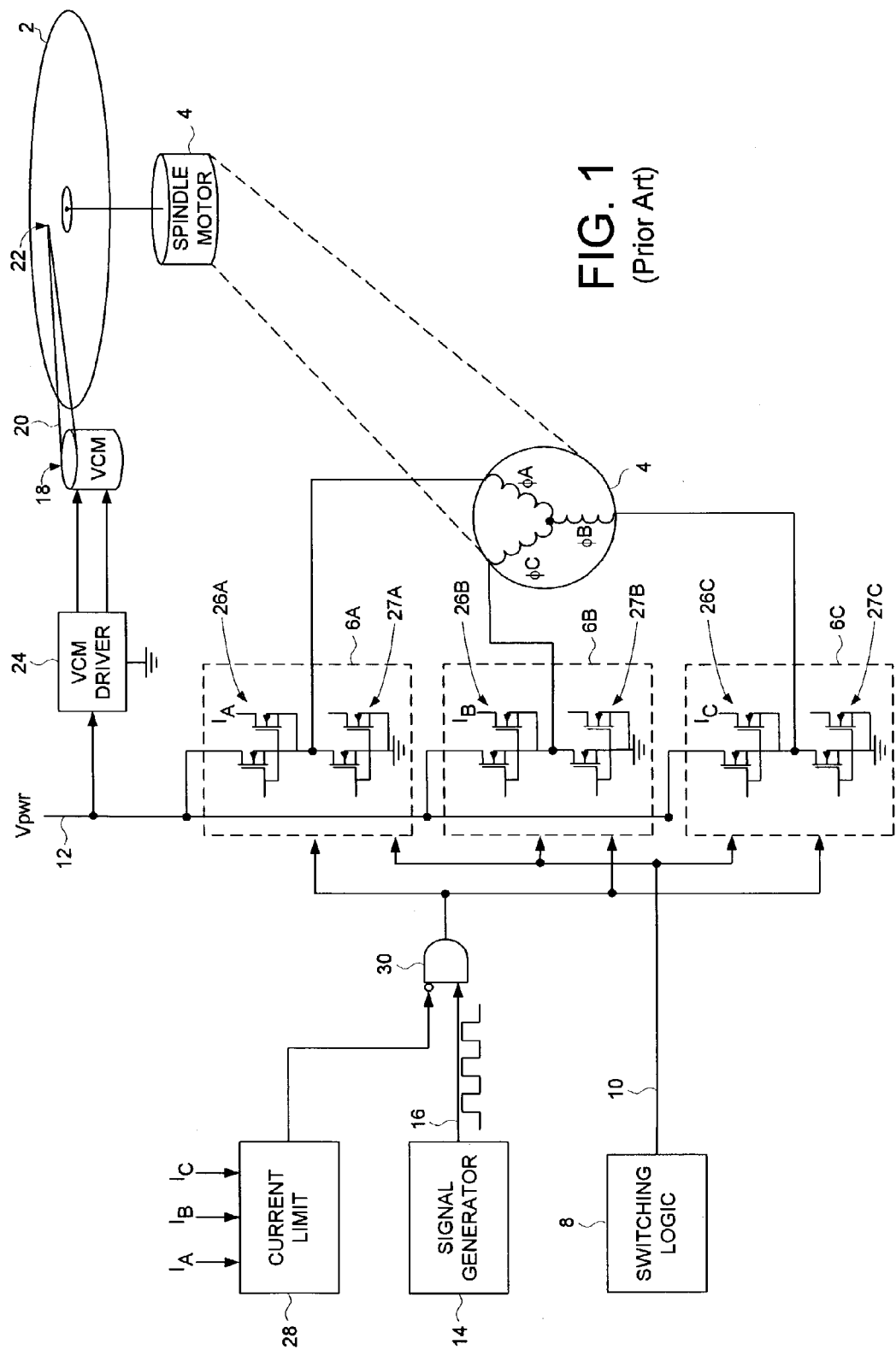
FIG. 1 shows a prior art disk drive comprising high-side current sensors for sensing the current through each switch in the spindle motor driver and for disconnecting the supply voltage from the spindle motor windings if the current flowing through any one of the switches exceeds a threshold.
Figure 2:
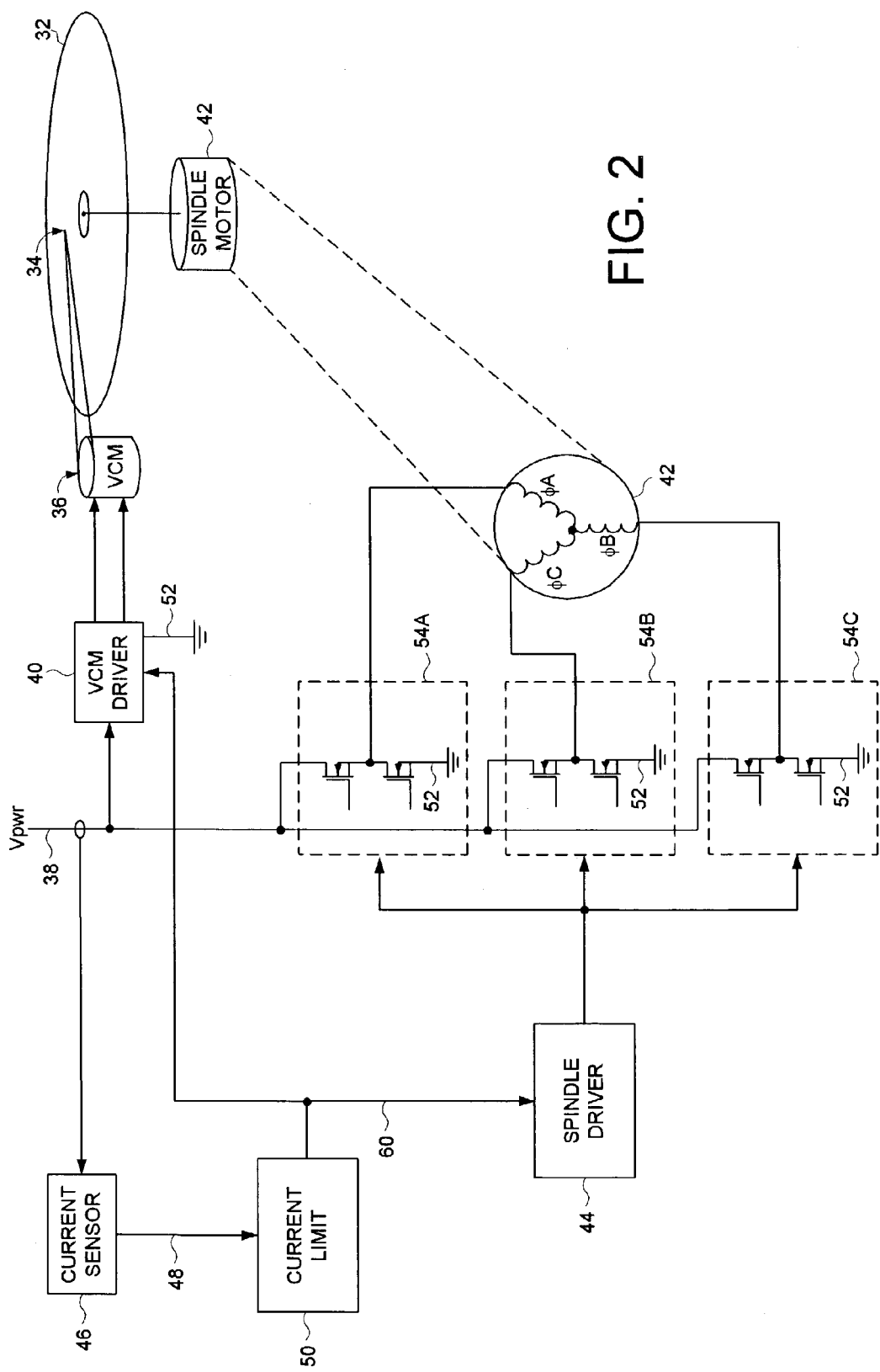
FIG. 2 shows a disk drive according to an embodiment of the present invention comprising a current sensor sensing the current flowing from the supply voltage and for disconnecting the spindle motor windings from the supply voltage and grounding the voice coil motor if the current flowing from the supply voltage exceeds a threshold.

FIG. 2 shows a disk drive according to an embodiment of the present invention. The disk drive comprises a disk 32, a head 34, a voice coil motor (VCM) 36 for actuating the head 34 over the disk 32, the VCM 36 comprising a voice coil having a first end and a second end. The disk drive further comprises an interface for receiving a supply voltage 38 from a host computer. A VCM driver 40 connects the voice coil to the supply voltage 38 in order to actuate the head 34 over the disk 32. A spindle motor 42 rotates the disk 32, the spindle motor 42 comprising a plurality of windings (φA, φB, φC), wherein each winding comprises a first end and a second end. A spindle driver 44 selectively connects the windings to the supply voltage 38 according to a commutation sequence in order to rotate the spindle motor 42. A first current sensor 46 generates a current sense signal 48 representing a current flowing from the supply voltage 38, and a current limit circuit 50 compares the current sense signal 48 to a first threshold. If the current sense signal 48 exceeds the first threshold, the windings are disconnected from the supply voltage 38, the voice coil is disconnected from the supply voltage 38, and the first and second ends of the voice coil are connected to ground 52.

In the embodiment of FIG. 2, the windings of the spindle motor 42 have a first end connected at a center tap to form a star configuration, and second ends connected to the supply voltage 38 or to ground 52 through a plurality of switches 54A–54C according to the commutation sequence (wherein the switches 54A–54C are implemented using any suitable circuitry, for example, using power field effect transistors). The windings may be connected in any suitable configuration including a conventional delta configuration.

Figure 3A:
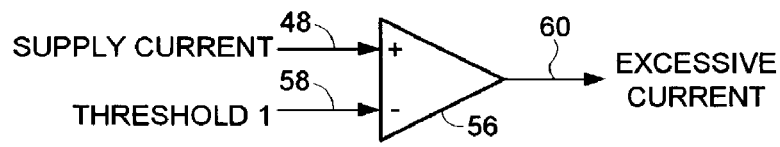
FIG. 3A shows an embodiment of the present invention wherein the spindle motor windings remain disconnected from the supply voltage and the voice coil motor remains grounded as long as the current flowing from the supply voltage exceeds a threshold.

The current sensor 46 for sensing the current flowing from the supply voltage 38 may comprise any suitable circuitry, such as a sense resistor or isolation transistor (iso-FET) implementing a current mirror. In addition, any suitable technique may be employed for comparing the current sense signal 48 to a threshold. FIG. 3A shows an embodiment of the present invention wherein an analog comparator 56 compares the current sense signal 48 to a first threshold 58 to generate an excessive current signal 60. The excessive current signal 60 disconnects the windings from the supply voltage 38 (e.g., by turning off the top switch of switches 54A–54C) and grounds the voice coil in the VCM 36 as long as the current sense signal 48 exceeds the first threshold 58.

Figure 3B:
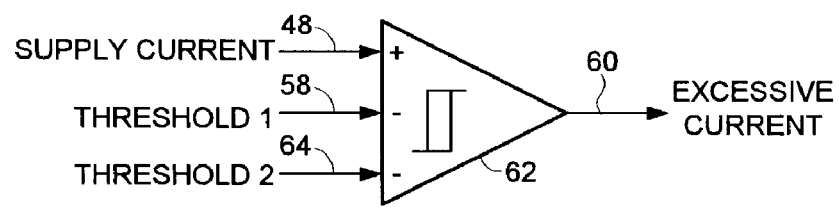
FIG. 3B shows an embodiment of the present invention wherein the spindle motor windings remain disconnected from the supply voltage and the voice coil motor remains grounded as long as the current flowing from the supply voltage exceeds a second threshold less than the first threshold using a hysteretic comparator.
Figure 3C:
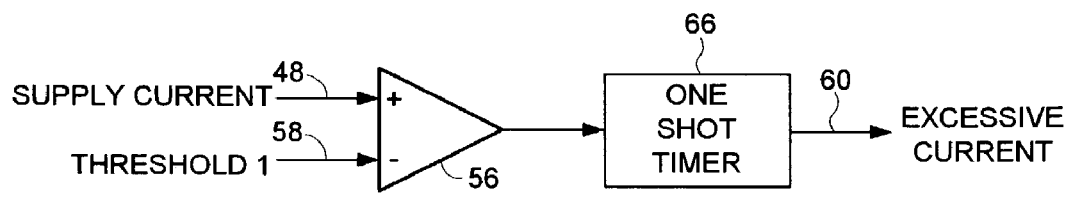
FIG. 3C shows an embodiment of the present invention wherein the windings remain disconnected from the supply voltage and the voice coil motor remains grounded for a predetermined interval after the current flowing from the supply voltage exceeds the threshold.

In an alternative embodiment, the current limit circuit 50 comprises hysteretic circuitry for allowing the excessive current to dissipate before re-activating the motor drivers. FIG. 3B shows an embodiment of the present invention employing a hysteretic analog comparator 62. In this embodiment, the windings remain disconnected from the supply voltage 38 and the first and second ends of the voice coil remain connected to ground 52 while the current sense signal 48 exceeds a second threshold 64 lower than the first threshold 58. In an alternative embodiment shown in FIG. 3C, the windings remain disconnected from the supply voltage 38 and the first and second ends of the voice coil remain connected to ground 52 for a predetermined interval after the current sense signal 48 exceeds the first threshold 58. In the embodiment of FIG. 3C, the predetermined interval is implemented using a one-shot timer 66 which may be programmable.

The spindle driver 44 in the embodiment of FIG. 2 comprises suitable switching logic for connecting the windings of the spindle motor to the supply voltage 38 and to ground 52 according to any suitable commutation sequence. For example, during one phase of the commutation sequence the top switch in switch 54A may be turned on and the bottom switch in switch 54C may be turned on so that current flows from the supply voltage 38 through windings φA, and φB to ground 52. In one embodiment, when the current sense signal 48 exceeds the first threshold 58, the top switches in switches 54A–54C are turned off in order to disconnect the windings from the supply voltage 38 and the bottom switches in switches 54A–54C are turned off in order to disconnect the windings from ground 52, thereby tristating the windings. In an alternative embodiment, when the current sense signal 48 exceeds the first threshold 58, the top switches in switches 54A–54C are turned off in order to disconnect the windings from the supply voltage 38 and the bottom switches in switches 54A–54C are turned on in order to ground the windings.

Figure 4:
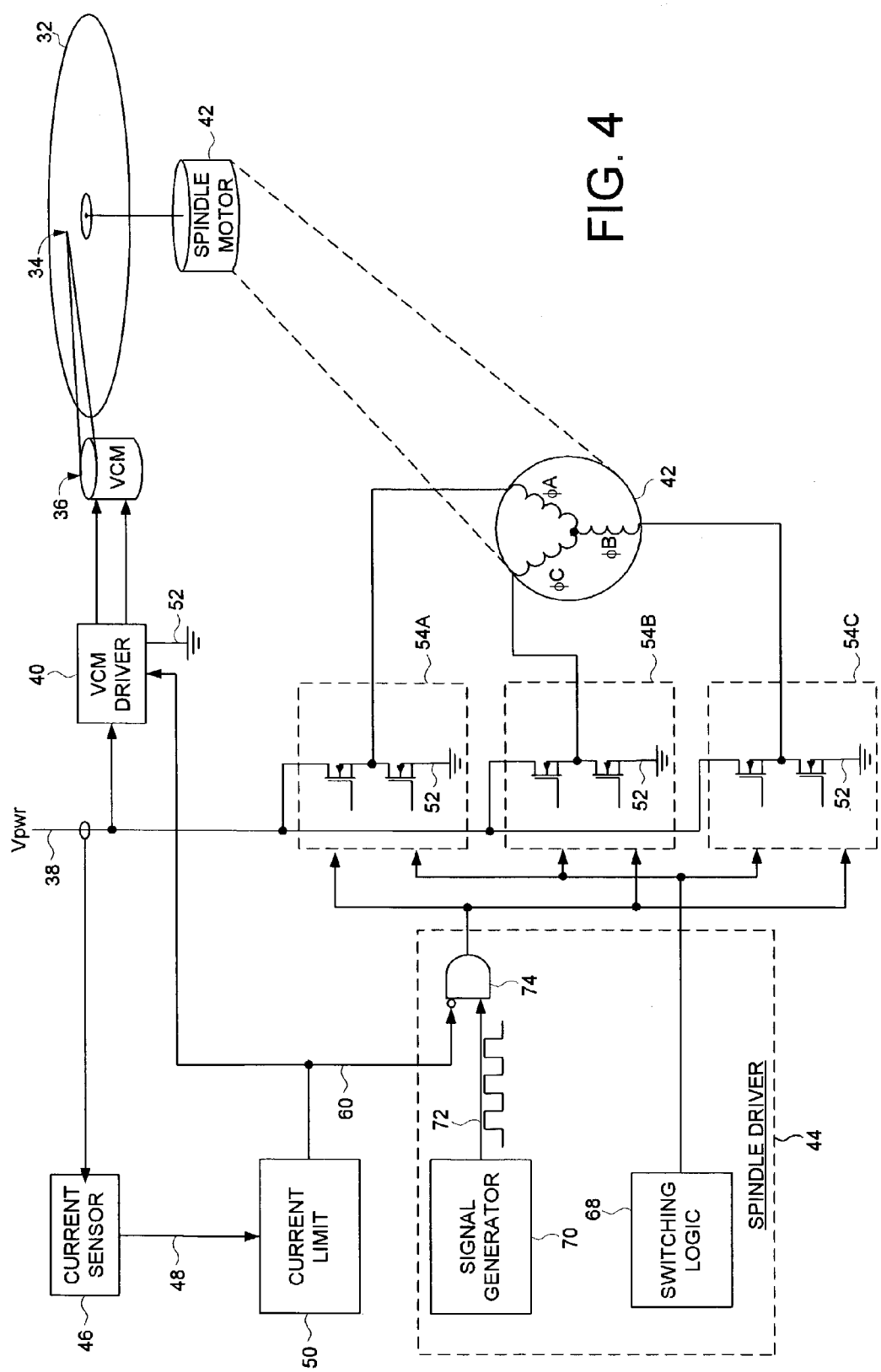
FIG. 4 shows a disk drive according to an embodiment of the present invention wherein a PWM signal controls the switches to control the amount of current flowing through the windings of the spindle motor from the supply voltage, wherein the PWM signal is disabled if the current flowing from the supply voltage exceeds the threshold.

FIG. 4 shows a disk drive according to an embodiment of the present invention wherein the spindle driver 44 comprises switching logic 68 for controlling the switches 54A–54C according to the commutation sequence. The spindle driver 44 further comprises a signal generator 70 for generating a pulse width modulated (PWM) signal 72 for controlling the switches 54A–54C to control the amount of current flowing through the windings from the supply voltage 38. The current limit circuit 50 deactivates the PWM signal 72 (through AND gate 74) to disconnect the windings from the supply voltage 38 if the current sense signal exceeds the first threshold.

Figure 5:
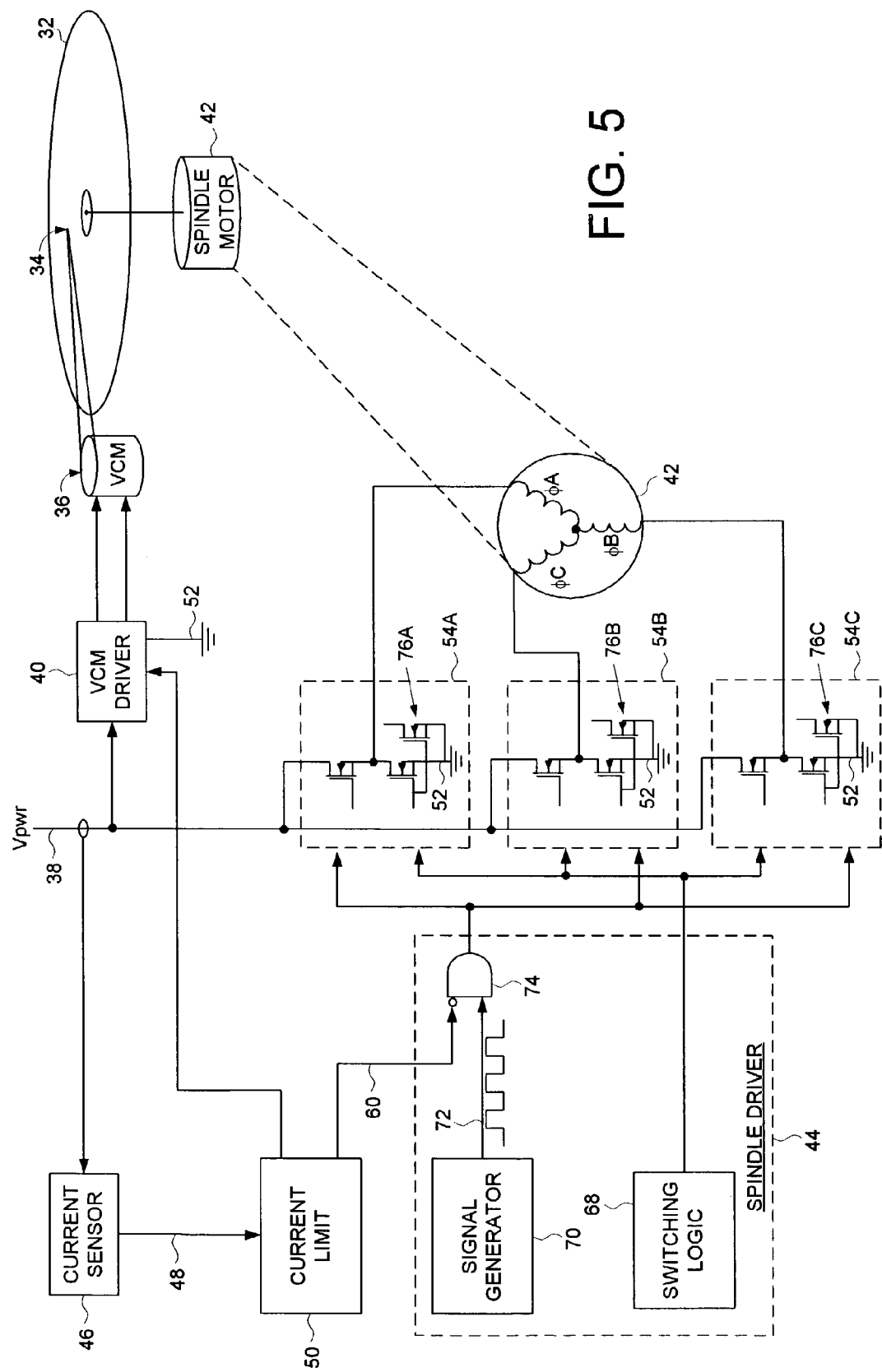
FIG. 5 shows a disk drive according to an embodiment of the present invention wherein low-side current sensors in each switch of the spindle driver are used for current regulation.

FIG. 5 shows a disk drive according to an embodiment of the present invention further comprising low-side current sensors 76A–76C for sensing the current flowing through each switch 54A–54C of the spindle driver. In one embodiment, the current sense signals from each current sensor 76A–76C are used to implement a current regulated servo loop. The current sensors 76A–76C may comprise any suitable circuitry, such as current mirror circuits shown in FIG. 5.

Figure 6:
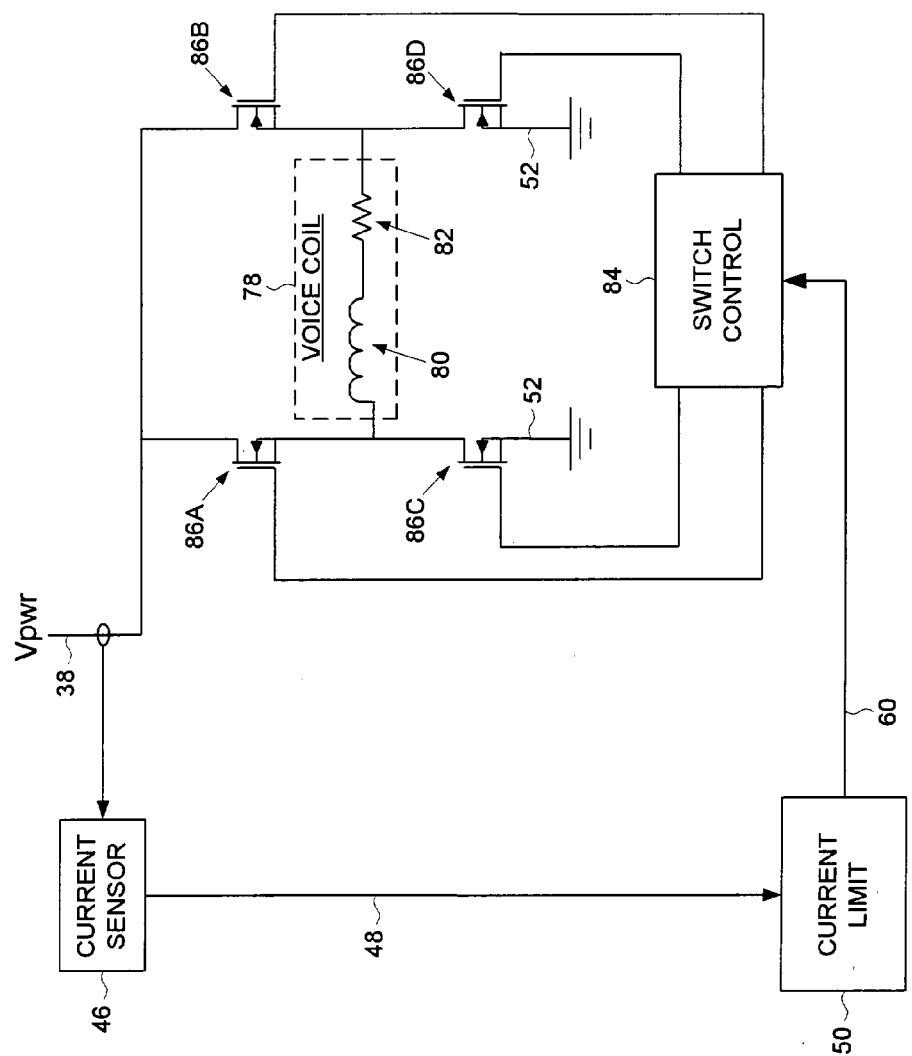
FIG. 6 shows an H-bridge driver according to an embodiment of the present invention for driving the voice coil of the VCM and for grounding the voice coil if the current flowing from the supply voltage exceeds the threshold.

FIG. 6 shows an H-bridge driver according to an embodiment of the present invention for driving the voice coil 78 of the VCM 36 and for grounding the voice coil 78 if the current flowing from the supply voltage 38 exceeds the threshold 58. The voice coil 78 is shown as comprising an inductance 80 and a resistance 82. Current is driven through the voice coil 78, in a direction depending on the desired rotation of the actuator arm, by connecting a first end of the voice coil 78 to the supply voltage 38 and the second end to ground 52. Switch control circuitry 84 configures a plurality of switches 86A–86D in order to connect the first end to the supply voltage 38 and the second end to ground 52. For example, if the desired direction of rotation is to move the head 34 from the outer diameter of the disk 32 to the inner diameter, switches 86A and 86D are turned on and switches 86B and 86C are turned off. If the desired direction of rotation is reversed, then switches 86B and 86C are turned on and switches 86A and 86D are turned off. The switches 86A–86D may be driven in a linear mode or in a PWM mode in order to control the amount of current flowing from the supply voltage 38 and thereby the amount of torque generated by the VCM 36.

If the current limit circuit 50 detects excessive current flowing from the supply voltage 38, the switch control circuitry 84 responds to the excessive current signal 60 by turning switches 86A and 86B off and switches 86C and 86D on thereby grounding the voice coil 78 until the excessive current dissipates. Grounding the voice coil 78 helps maintain the motor current (and therefore motor speed) so as to minimize the transient effect due to disconnecting the supply voltage 38 for a short interval.

I claim:

1. A disk drive comprising:
   (a) a disk;
   (b) a head;
   (c) a voice coil motor (VCM) for actuating the head over the disk, the VCM comprising a voice coil having a first end and a second end;
   (d) an interface for receiving a supply voltage from a host computer;
   (e) a VCM driver for connecting the voice coil to the supply voltage in order to actuate the head over the disk;
   (f) a spindle motor for rotating the disk, the spindle motor comprising a plurality of windings, wherein each winding comprises a first end and a second end;
   (g) a spindle driver for selectively connecting the windings to the supply voltage according to a commutation sequence in order to rotate the spindle motor;
   (h) a first current sensor for generating a current sense signal representing a current flowing from the supply voltage; and
   (i) a current limit circuit for comparing the current sense signal to a first threshold,
      wherein if the current sense signal exceeds the first threshold:
      the windings are disconnected from the supply voltage; and
      the voice coil is disconnected from the supply voltage and the first and second ends of the voice coil are connected to ground.

2. The disk drive as recited in claim 1, wherein the windings remain disconnected from the supply voltage and the first and second ends of the voice coil remain connected to ground while the current sense signal exceeds a second threshold lower than the first threshold.

3. The disk drive as recited in claim 1, wherein the windings remain disconnected from the supply voltage and the first and second ends of the voice coil remain connected to ground for a predetermined interval after the current sense signal exceeds the first threshold.

4. The disk drive as recited in claim 1, wherein:
   (a) the spindle driver comprises a plurality of switches for selectively connecting the windings to the supply voltage and switching logic for controlling the switches according to the commutation sequence;
   (b) the switches for selectively connecting the windings to ground according to the commutation sequence in order to rotate the spindle motor; and
   (c) the current limit circuit disconnects the windings from the supply voltage and disconnects the windings from ground if the current sense signal exceeds the first threshold.

5. The disk drive as recited in claim 1, wherein:
   (a) the spindle driver comprises a plurality of switches for selectively connecting the windings to the supply voltage and switching logic for controlling the switches according to the commutation sequence;
   (b) the switches for selectively connecting the windings to ground according to the commutation sequence in order to rotate the spindle motor; and
   (c) the current limit circuit disconnects the windings from the supply voltage and connects the windings to ground if the current sense signal exceeds the first threshold.

6. The disk drive as recited in claim 1, wherein the spindle driver comprises:
   (a) a plurality of switches for selectively connecting the windings to the supply voltage;
   (b) switching logic for controlling the switches according to the commutation sequence; and
   (c) a signal generator for generating a pulse width modulated (PWM) signal, wherein:
      the PWM signal for controlling the switches to control the amount of current flowing through the windings from the supply voltage; and the current limit circuit deactivates the PWM signal to disconnect the windings from the supply voltage if the current sense signal exceeds the first threshold.

7. A method of operating a disk drive, the disk drive comprising a disk, a head, a voice coil motor (VCM) for actuating the head over the disk, the VCM comprising a voice coil having a first end and a second end, an interface for receiving a supply voltage from a host computer, and a spindle motor for rotating the disk, the spindle motor comprising a plurality of windings, wherein each winding comprises a first end and a second end, the method comprising the steps of:
 (a) connecting the voice coil to the supply voltage to actuate the head over the disk;
 (b) selectively connecting the windings of the spindle motor to the supply voltage according to a commutation sequence in order to rotate the spindle motor;
 (c) generating a current sense signal representing a current flowing from the supply voltage;
 (d) comparing the current sense signal to a first threshold; and
 (e) if the current sense signal exceeds the first threshold:
  disconnecting the windings from the supply voltage; and
  disconnecting the voice coil from the supply voltage and connecting the first and second ends of the voice coil to ground.

8. The method of operating a disk drive as recited in claim 7, wherein the windings remain disconnected from the supply voltage and the first and second ends of the voice coil remain connected to ground while the current sense signal exceeds a second threshold lower than the first threshold.

9. The method of operating a disk drive as recited in claim 7, wherein the windings remain disconnected from the supply voltage and the first and second ends of the voice coil remain connected to ground for a predetermined interval after the current sense signal exceeds the first threshold.

10. The method of operating a disk drive as recited in claim 7, further comprising the steps of:
 (a) connecting the windings to ground according to the commutation sequence in order to rotate the spindle motor; and
 (b) disconnecting the windings from the supply voltage and disconnecting the windings from ground if the current sense signal exceeds the first threshold.

11. The method of operating a disk drive as recited in claim 7, further comprising the steps of:
 (a) connecting the windings to ground according to the commutation sequence in order to rotate the spindle motor; and
 (b) disconnecting the windings from the supply voltage and connecting the windings to ground if the current sense signal exceeds the first threshold.

12. The method of operating a disk drive as recited in claim 7, further comprising the step of generating a pulse width modulated (PWM) signal for controlling the amount of current flowing through the windings from the supply voltage, wherein the step of disconnecting the windings from the supply voltage comprises the step of deactivating the PWM signal if the current sense signal exceeds the first threshold.

* * * * *